US009381432B2

(12) United States Patent
Justice et al.

(10) Patent No.: US 9,381,432 B2
(45) Date of Patent: Jul. 5, 2016

(54) GAME MIGRATION

(75) Inventors: John Raymond Justice, Bellevue, WA (US); Kenneth Alan Lobb, Sammamish, WA (US); Ray Wayne Davis, Kirkland, WA (US); Krassimir Emilov Karamfilov, Bellevue, WA (US); Frank R. Morrison, III, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/593,843

(22) Filed: Aug. 24, 2012

(65) Prior Publication Data

US 2014/0057722 A1    Feb. 27, 2014

(51) Int. Cl.
G06F 17/00 (2006.01)
A63F 13/40 (2014.01)
A63F 13/30 (2014.01)

(52) U.S. Cl.
CPC ............... *A63F 13/10* (2013.01); *A63F 13/12* (2013.01); *A63F 2300/534* (2013.01); *A63F 2300/538* (2013.01); *A63F 2300/554* (2013.01)

(58) Field of Classification Search
CPC ... A63F 13/12; A63F 13/10; A63F 2300/552; A63F 2300/407; A63F 2300/538
USPC .......................................................... 463/42
See application file for complete search history.

(56) References Cited

U.S. PATENT DOCUMENTS

| | | | |
|---|---|---|---|
| 5,838,909 A | 11/1998 | Roy et al. | |
| 6,038,599 A | 3/2000 | Black et al. | |
| 6,377,257 B1 | 4/2002 | Borrel et al. | |
| 6,415,317 B1 | 7/2002 | Yelon et al. | |
| 6,884,172 B1 | 4/2005 | Lloyd et al. | |
| 7,887,416 B2 | 2/2011 | Katsume et al. | |

(Continued)

FOREIGN PATENT DOCUMENTS

| | | |
|---|---|---|
| EP | 1640047 A1 | 3/2006 |
| EP | 1779909 A2 | 5/2007 |

(Continued)

OTHER PUBLICATIONS

Leung, et al., "Onlive Cloud Gaming Service", Published on: May 2011, 14 pages, SE 172/272 Enterprise Software, Available at: http://www.sjsu.edu/people/rakesh.ranjan/courses/cmpe272/s1/Team%20WS%20OnLive%20Cloud%20Gaming%20Service.pdf.

(Continued)

*Primary Examiner* — Pierre E Elisca
*Assistant Examiner* — Carl V Larsen
(74) *Attorney, Agent, or Firm* — Micah Goldsmith; Judy Yee; Micky Minhas

(57) ABSTRACT

Embodiments of the present invention allow game play to migrate back and forth between a server-run video game and a client-run video game. For example, a user could start playing a video game running on a server and then migrate play to a client device, such as a game console. When a game is running on the server, the server executes the game code, renders a video image, and communicates the image to the client. The client may communicate game control commands to the server. The game play may also start on the client and transition to a server. For example, a user may reach a point in the game where the user does not have the game files stored on the client.

18 Claims, 7 Drawing Sheets

(56) References Cited

U.S. PATENT DOCUMENTS

| | | | |
|---|---|---|---|
| 7,889,669 | B2 | 2/2011 | Abigail |
| 7,971,157 | B2 | 6/2011 | Markovic et al. |
| 8,038,535 | B2 | 10/2011 | Jensen |
| 8,092,307 | B2 | 1/2012 | Kelly |
| 8,151,199 | B2 | 4/2012 | Gerson et al. |
| 8,176,437 | B1 | 5/2012 | Taubman |
| 8,264,493 | B2 | 9/2012 | Peterfreund |
| 8,668,582 | B1 | 3/2014 | Overton |
| 2002/0142843 | A1 | 10/2002 | Roelofs |
| 2004/0003039 | A1 | 1/2004 | Humphrey |
| 2004/0030882 | A1 | 2/2004 | Forman |
| 2004/0082388 | A1 | 4/2004 | Simsek et al. |
| 2004/0135805 | A1* | 7/2004 | Gottsacker et al. .......... 345/751 |
| 2004/0193813 | A1 | 9/2004 | Nguyen et al. |
| 2006/0135258 | A1 | 6/2006 | Maheshwari et al. |
| 2006/0281511 | A1 | 12/2006 | Holm et al. |
| 2007/0173325 | A1 | 7/2007 | Shaw et al. |
| 2007/0195097 | A1 | 8/2007 | Heesemans |
| 2007/0232396 | A1 | 10/2007 | Yoo |
| 2008/0037534 | A1 | 2/2008 | Shina |
| 2008/0207322 | A1 | 8/2008 | Mizrahi |
| 2009/0094600 | A1* | 4/2009 | Sargaison et al. .......... 717/177 |
| 2009/0111574 | A1 | 4/2009 | Rowe |
| 2009/0111576 | A1 | 4/2009 | Ostergren et al. |
| 2009/0118019 | A1 | 5/2009 | Perlaman |
| 2009/0119729 | A1* | 5/2009 | Periman ................ A63F 13/12 725/114 |
| 2009/0215538 | A1 | 8/2009 | Jew |
| 2009/0247295 | A1 | 10/2009 | Weldon |
| 2010/0197405 | A1 | 8/2010 | Douceur et al. |
| 2010/0304860 | A1 | 12/2010 | Gault et al. |
| 2010/0306813 | A1 | 12/2010 | Perry et al. |
| 2011/0025689 | A1 | 2/2011 | Perez |
| 2011/0086706 | A1 | 4/2011 | Zalewski |
| 2011/0088071 | A1 | 4/2011 | Yerli |
| 2011/0096089 | A1 | 4/2011 | Shenhav et al. |
| 2011/0145362 | A1 | 6/2011 | Jones et al. |
| 2011/0157196 | A1 | 6/2011 | Nave et al. |
| 2011/0210982 | A1 | 9/2011 | Sylvan et al. |
| 2011/0225040 | A1* | 9/2011 | Yerli ...................... 705/14.49 |
| 2011/0250949 | A1 | 10/2011 | Van Os et al. |
| 2011/0256912 | A1 | 10/2011 | Baynes et al. |
| 2012/0004039 | A1 | 1/2012 | Perry et al. |
| 2012/0004041 | A1* | 1/2012 | Pereira et al. ................ 463/42 |
| 2012/0004042 | A1 | 1/2012 | Perry et al. |
| 2012/0009997 | A1 | 1/2012 | Youm |
| 2012/0064968 | A1 | 3/2012 | Youm et al. |
| 2012/0064976 | A1 | 3/2012 | Gault et al. |
| 2012/0072911 | A1 | 3/2012 | Whaley et al. |
| 2012/0079095 | A1 | 3/2012 | Evans et al. |
| 2012/0299938 | A1 | 11/2012 | Iwasaki |
| 2013/0046893 | A1* | 2/2013 | Hauser ................ G06F 9/4856 709/226 |
| 2013/0225287 | A1 | 8/2013 | Bronstein Bendayan et al. |
| 2013/0344966 | A1 | 12/2013 | Mustafa |
| 2014/0040970 | A1* | 2/2014 | Alexander et al. .......... 725/116 |

FOREIGN PATENT DOCUMENTS

| | | |
|---|---|---|
| EP | 2340877 A2 | 7/2011 |
| EP | 2340878 A2 | 7/2011 |
| WO | 99/32990 | 7/1999 |
| WO | 01/36061 | 5/2001 |
| WO | 2005/061068 | 7/2005 |
| WO | 2007119236 | 10/2007 |
| WO | 2012/107739 | 8/2012 |
| WO | 2012166305 A1 | 12/2012 |
| WO | 2013006802 | 1/2013 |
| WO | 2013023069 | 2/2013 |

OTHER PUBLICATIONS

PCT App. No. PCT/US2013/051180, International Search Report and Written Opinion, dated Oct. 14, 2013, 13 pages.

Bhuvan Urgaonkar et al. Agile Dynamic Provisioning of Multi-Tier Internet Applications, ACM Transactions on Autonomous and Adaptive Systems, vol. 3, No. 1, Mar. 1, 2008, pp. 1-39, XP055081646.

Machida F et al., Just-In-Time Server Provisioning Using Virtual Machine Standby and Request Prediction, Autonomic Computing, 2008, ICAC, 08, International Conference on, IEEE, Piscataway, NJ USA, Jun. 2, 2008, pp. 163-171, XP031276805.

Shaikh A et al., On Demand Platform for Online Games, IBM Systems Jounral, IBM Corp., Armonk, New York, US, vol. 45, No. 1, Jan. 1, 2003, pp. 7-19, XP002492825.

PCT Search Report dated Oct. 31, 2013 re PCT/US2013/055234, 9 pages.

Notification of Transmittal of the International Search Report and the Writen Opinion of the International Searching Authority, or the Declaration in PCT/US2013/76871 mailed Mar. 13, 2014, 11 pages.

PCT Search Report dated Mar. 27, 2014 re Appl. No. PCT/US2013/076918 (11 pages).

International Search Report with Written Opinion mailed Jul. 31, 2014 in Application No. PCT/US2014/022712, 11 pages.

Non-Final Office Action dated Sep. 30, 2014 in U.S. Appl. No. 13/723,498, 12 pages.

Notice of Allowance dated Oct. 20, 2014 in U.S. Appl. No. 13/554,215, 8 pages.

Raghuraman et al "Immersive Multiplayer Tennis With Microsoft Kinect and Body Sensor Network" Published Oct. 29-Nov. 2, 2012, 4 pages.

Dance Central Game Manual released Nov. 4, 2010, 12 pages.

Non-Final Office Action dated Dec. 4, 2014 in U.S. Appl. No. 13/723,652, 11 pages.

International Search Report with Written Opinion mailed Aug. 5, 2014 in Application No. PCT/US2014/023096, 10 pages.

Components of a Multiplayer Game, Published on: Jul. 11, 2011, 7 pages, available at: http://www.jenkinssoftware.com/raknel/manual/multiplayergamecomponents.html.

Jurgelionis, et al., "Platform for Distributed 3D Gaming", In International Journal of Computer Games Technology-Special Issue on Cyber Games and Interactive Entertainment, vol. 2009, Article ID 231863, Jan. 2009, 15 pages.

Wang, et al., "Modeling and Characterizing User Experience in a Cloud Server Based Mobile Gaming Approach", In Proceedings of the 28th IEEE Conference on Global Telecommunications, Nov. 30, 2009, pp. 1-7.

Chen, et al., "Measuring the Latency of Cloud Gaming Systems", In Proceedings of the 19th ACM International Conference on Multimedia, Nov. 28, 2011, pp. 1269-1272.

Marzolla, et al., "Dynamic Resource Provisioning for Cloud-based Gaming Infrastructures", In Proceedings of the ACM Computers in Entertainment, vol. 9, No. 4, Article 39, Mar. 2011, 19 pages.

Claypool, et al., "Latency Can Kill: Precision and Deadline in Online Games", In Proceedings of the First Annual ACM SIGMM Conference on Multimedia Systems, Feb. 22, 2010, pp. 215-222.

Bernier, Yahn W., "Latency Compensating Methods in Client/Server In-game Protocol Design and Optimization", In Proceedings of the 15th Games Developers Conference, Mar. 2001, 13 pages.

Shi, Shu, "Reduce Latency: The Key to Successful Interactive Remote Rendering Systems", In IEEE International Conference on Pervasive Computing and Communications Workshops, Mar. 21, 2011, 2 pages.

Winter, et al., "A Hybrid Thin-Client Protocol for Multimedia Streaming and Interactive Gaming Applications", In 16th International Workshop on Network and Operating Systems Support for Digital Audio and Video, Nov. 22, 2006, 7 pages.

Kunsemoller, et al., ""A Game-Theoretical Approach to the Benefits of Cloud Computing"", Retrieved on: Jan. 30, 2012,Available at: http://www.my-groups.de/gecon2011/publications/Kuensemoeller_GECON2011.pdf.

Day, Nathan, ""Building a True Real-Time Multiplayer Gaming Platform"", Published on: Oct. 11, 2011, Available at:http://blog.softlayer.com/2011/building-a-true-real-time-multiplayer-gaming-platform/.

(56) References Cited

OTHER PUBLICATIONS

Final Office Action dated May 7, 2015 in U.S. Appl. No. 13/723,498, 9 pages.
Kim, et al., "Multi-view Rendering Approach for Cloud-based Gaming Services", In the Third International Conference on Advances in Future Internet, Aug. 21, 2011, pp. 102-107.
"Office Action Issued in European Patent Application No. 13742806.6", Mailed Date: Jun. 24, 2015, 3 Pages.
Non-Final Office Action dated Jul. 30, 2015 in U.S. Appl. No. 13/723,652, 7 pages.
Final Office Action dated Jan. 26, 2015 in U.S. Appl. No. 13/723,652, 12 pages.
Final Office Action dated Feb. 12, 2016 in U.S. Appl. No. 14/179,154, 14 pages.
Non-Final Office Action dated Mar. 11, 2016 in U.S. Appl. No. 14/180,043, 32 pages.
Non-Final Office Action dated Mar. 11, 2016 in U.S. Appl. No. 13/723,498, 8 pages.
Non-Final Office Action dated Apr. 7, 2016 in U.S. Appl. No. 13/723,652, 8 pages.

* cited by examiner

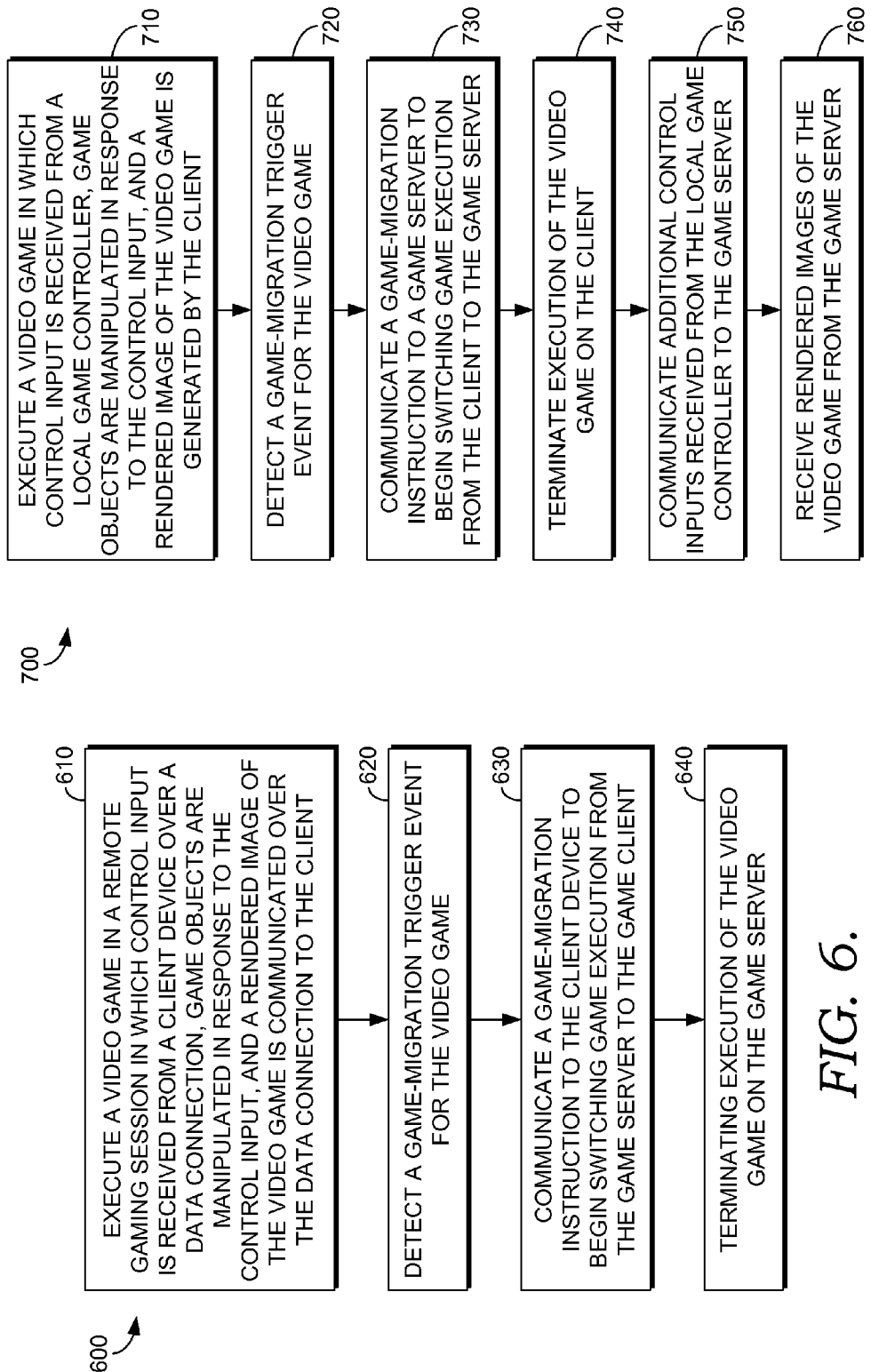

GAME MIGRATION

BACKGROUND

Video games may be purchased online and downloaded to a video game console for play. Players need to wait until the entire game is downloaded to begin playing the game. Video games may also be played on a server without downloading the executable game code to the client device.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention allow game play to migrate back and forth between a server-run video game and a client-run video game. For example, a user could start playing a video game running on a server and then migrate play to a client device, such as a game console. When a game is running on the server, the server executes the game code, renders a video image, and communicates the image to the client. The client may communicate game control commands to the server.

The game files need to be accessible to the client device before the client takes over game execution. In one embodiment, the server downloads the game files to the client device during game play. The download may be throttled to prevent disruption or degradation of the ongoing gaming experience by limiting the download rate to a portion of the user's bandwidth not consumed by the game play. Once the game files, or a first block of game files, are downloaded, game play can switch to the client.

The game play may also start on the client and transition to a server. For example, a user may reach a point in the game where the user does not have the game files stored on the client. For example, a user could be playing the first level, which is part of the first game block, and then want to skip to the sixth level, which is part of the fourth game block that has not yet been downloaded. In this case, the game play may transition back to the cloud until the fourth game block is downloaded. Once the download of the fourth block is completed, the user can be transitioned back to play on the game console. In one embodiment, a user is transitioned between client and server when a nondisruptive switching point in the game is reached. Reaching the end of a level is one example of a nondisruptive switching point.

BRIEF DESCRIPTION OF THE DRAWINGS

Embodiments of the invention are described in detail below with reference to the attached drawing figures, wherein:

FIG. 6 is a flow chart showing a method of migrating game play from a game server to a client device, in accordance with an embodiment of the present invention;

FIG. 7 is a flow chart showing a method of migrating game play from a client device to a game server, in accordance with an embodiment of the present invention.

DETAILED DESCRIPTION

Figure 1:
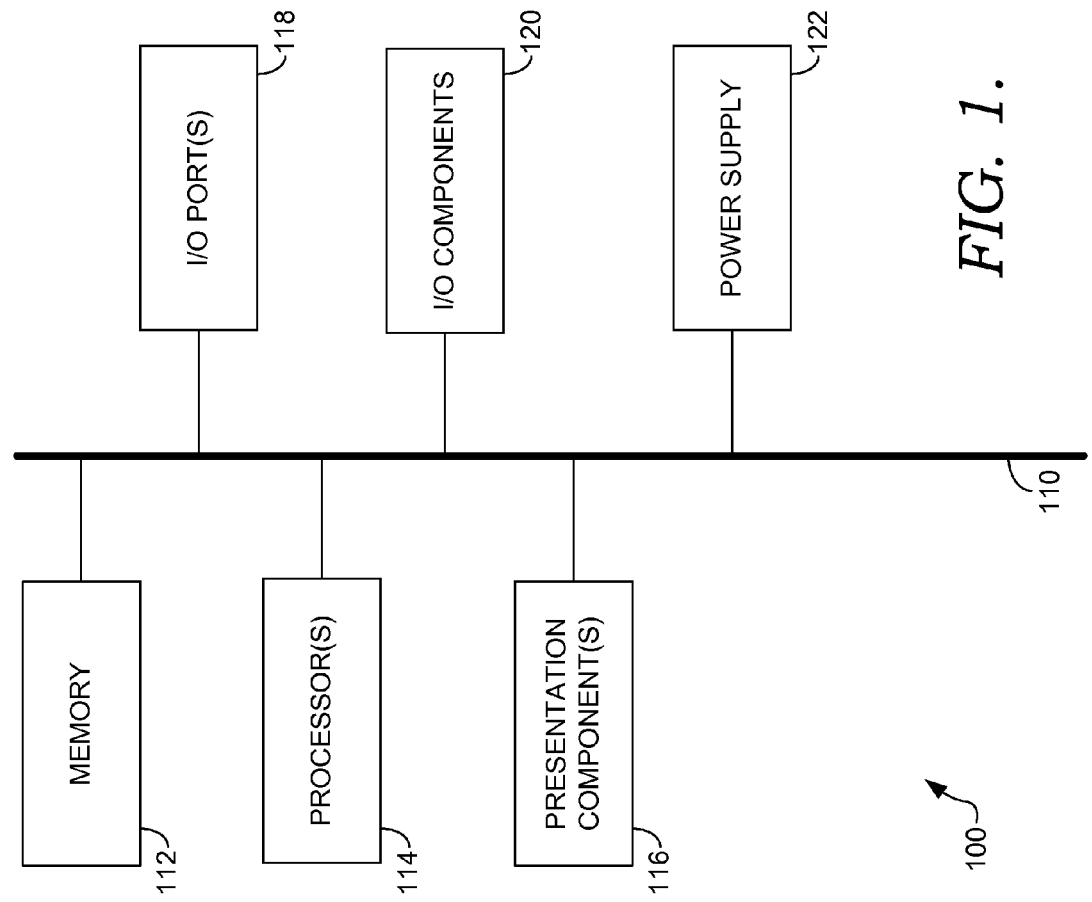
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention allow game play to migrate back and forth between a server-run video game and a client-run video game. For example, a user could start playing a video game running on a server and then migrate play to a client device, such as a game console. When a game is running on the server, the server executes the game code, renders a video image, and communicates the image to the client. The client may communicate game control commands to the server.

As used in this application, running a game includes rendering the video game image. Rendering is a process of generating a video game image from game scene files. The scene files contain geometry, lighting, text, and other information that describe game objects. Exemplary game objects include background and foreground objects, game characters, game weapons, game special effects, and other features of the video game scene. The objects themselves may be manipulated in response to user inputs, such as gestures picked up by a camera, touch input on a touch screen, joystick and button inputs on a game controller, keystrokes, voice commands, and other input. The rendering may be done through a graphics pipeline associated with a graphics processing unit (GPU). Once rendered, the image may be output for a display.

Embodiments to the present invention may describe a game as running on either the server or the client. A game is running on a device when the device is rendering the game image, though other devices may perform processing steps that are part of game play. For example, a client may preprocess control inputs and communicate them to a server that executes the game code and renders an image that is communicated back to the client. In addition, the client device may scale the rendered image for display. In this case, the server is described as running the game, though the client device is performing some game play-related and display-related processing. In multi-player games where players are connected via a network, the server may send geometry and other game information to the client for the client to render.

In one embodiment, a user starts playing the game on the server. As mentioned, though described as playing the game on the server, the image may be transmitted from a server to a client device where it is displayed. Similarly, the controls and game input may be uploaded from the client to the server where they are used to manipulate the game and render the video game images. At some point, a triggering event may occur that causes the initiation of a migration process. For example, the user may choose to purchase a full version of the game being played. At this point, the user continues playing the game on the server while the game service determines how much bandwidth is available for downloading blocks of game code to the client device. If the game session is currently utilizing 6 Mbps of a 12 Mbps connection, then the game migration component may begin downloading the full game to the console within the other 6 Mbps available. The game service may continuously monitor bandwidth usage and throttle the download to prevent degradation of the game experience. For example, if in addition to the game session, the user accesses a music streaming service and the available bandwidth is reduced to 4 Mbps, then the download would accordingly be throttled to 4 Mbps.

The game files need to be accessible to the client device before the client takes over game execution. In one embodiment, the server downloads the game files to the client device during game play. The download may be throttled to prevent disruption or degradation of the ongoing gaming experience by limiting the download rate to a portion of the user's bandwidth not consumed by the game play. Once the game files, or a first block of game files, are downloaded, game play can switch to the client.

The game play may also start on the client and transition to a server. For example, a user may reach a point in the game where they do not have the game files stored on the client. A user could be playing the first level, which is part of the first game block, and then want to skip to the sixth level, which is part of the fourth game block that has not yet been downloaded. In this case, the game play may transition back to the cloud until the fourth game block is downloaded. Once the download is completed, the user can be transitioned back to play on the game console. In one embodiment, a user is transitioned between client and server when a nondisruptive switching point in the game is reached. Reaching the end of a level is one example of a nondisruptive switching point.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Online Gaming Environment

Figure 2:
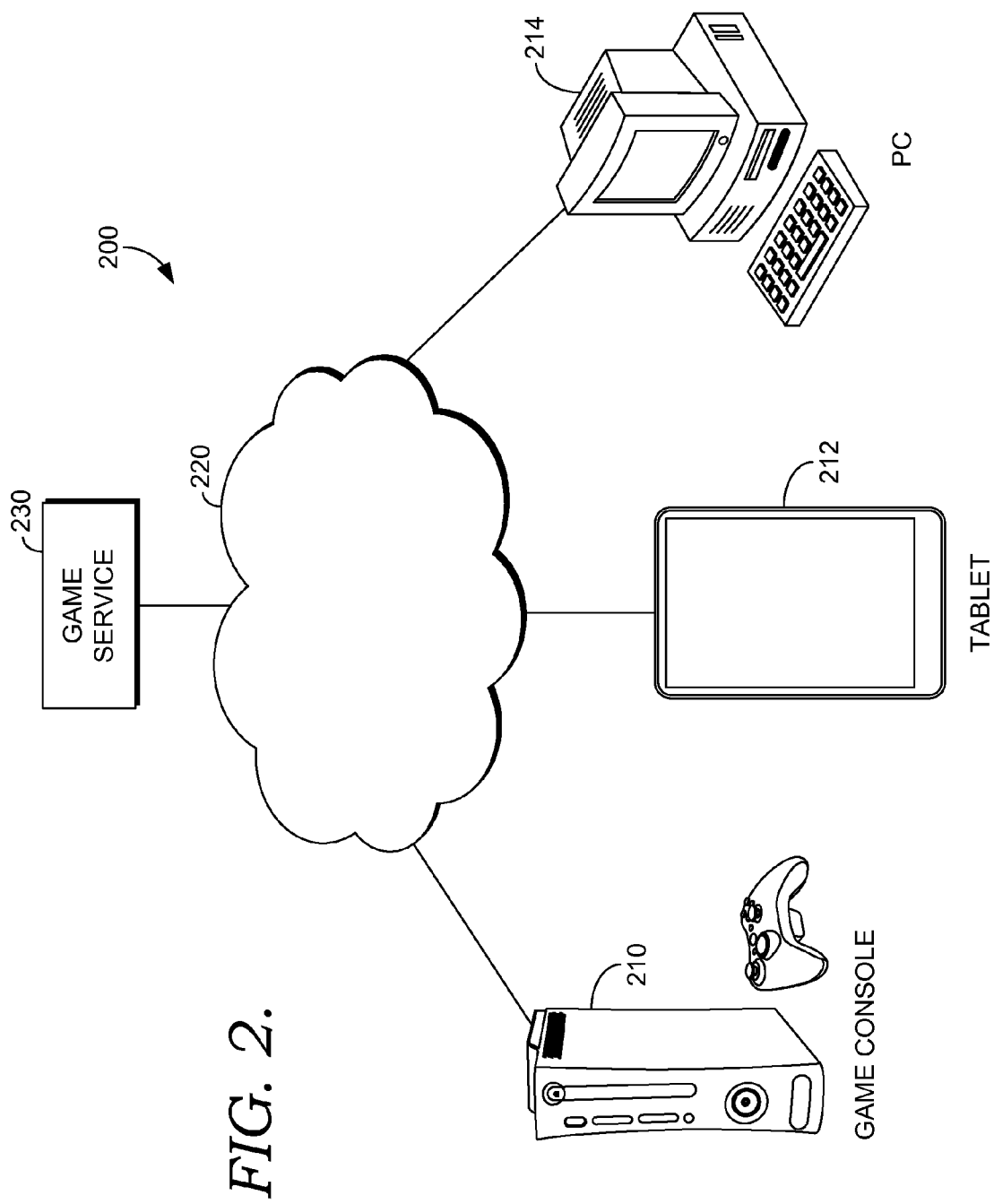
FIG. 2 is a diagram of an online gaming environment, in accordance with an embodiment of the present invention.

Turning now to FIG. 2, an online gaming environment 200 is shown, in accordance with an embodiment of the present invention. The online gaming environment 200 comprises various game clients connected through a network 220 to a game service 230. Exemplary game clients include a game console 210, a tablet 212, and a personal computer 214. Use of other game clients, such as smart phones, are also possible. The game console 210 may have one or more game controllers communicatively coupled to it. In one embodiment, the tablet 212 may act as an input device for a game console 210 or a personal computer 214. In another embodiment, the tablet 212 is a stand-alone game client. Network 220 may be a wide area network, such as the Internet.

Game service 230 comprises multiple computing devices communicatively coupled to each other. In one embodiment, the game service 230 is implemented using one or more server farms. The server farms may be spread out across various geographic regions including cities throughout the world. In this scenario, the game clients may connect to the closest server farms. Embodiments of the present invention are not limited to this setup.

The game service 230 allows the game to be executed within the computing devices provided by the game service 230. A communication session between the game service and game clients carries input traffic to the game service 230 and returns a rendered game image. In this embodiment, a computing device that is part of the game service executes the video game code using a control stream generated by input devices associated with the various game clients. The rendered video game is then communicated over the network to the game client where the rendered game is output for display.

Exemplary Game Client and Game Service for Game Migration

Figure 3:
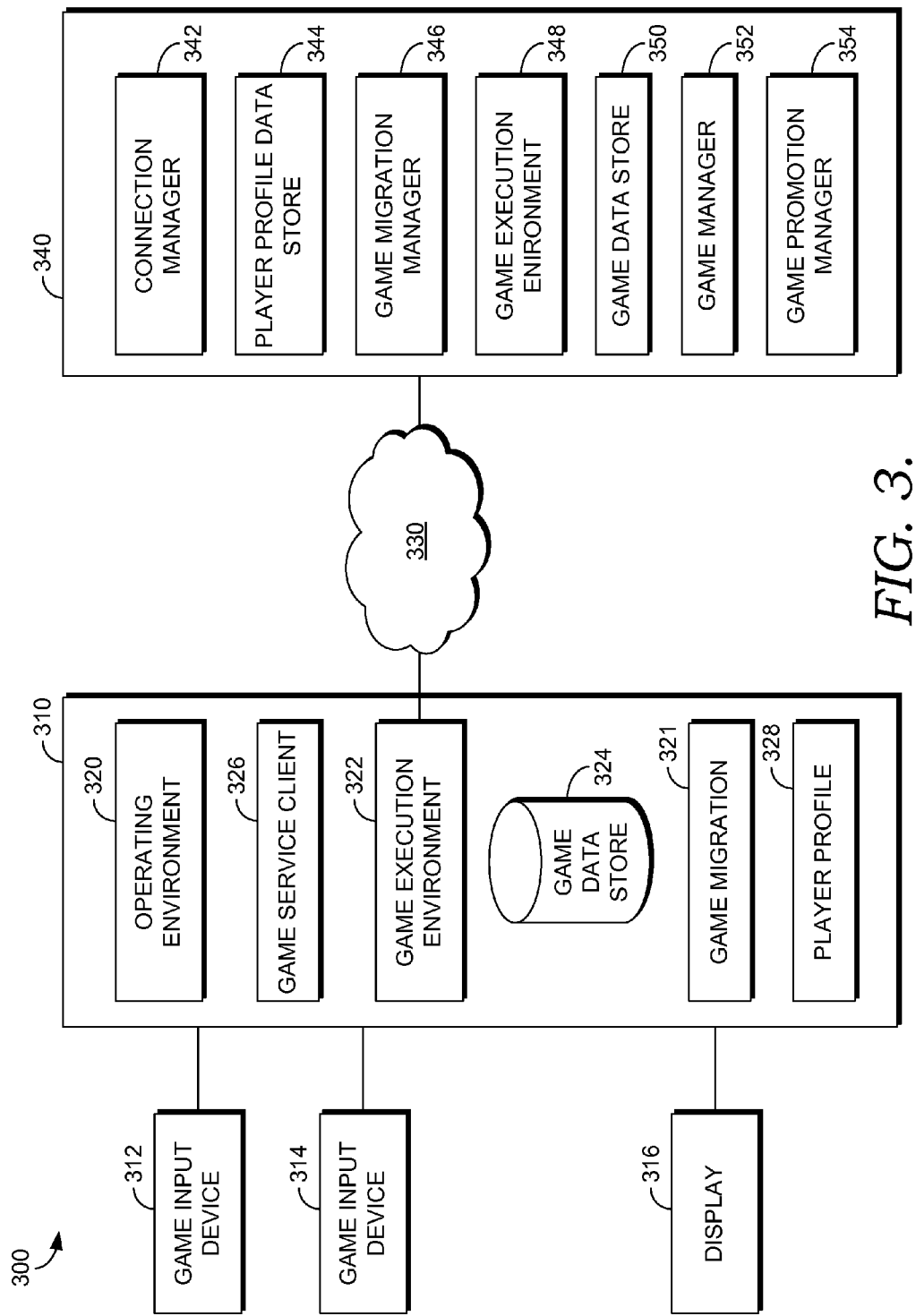
FIG. 3 is a diagram of a game migration environment, in accordance with an embodiment of the present invention.

Turning now to FIG. 3, an exemplary game migration environment 300 is shown, in accordance with an embodiment of the present invention. The game migration environment 300 includes a game client 310 is shown communicatively coupled to a game server 340 through a network 330. In one embodiment, the network may be the Internet. The game client 310 is connected to a first game input device 312, a second game input device 314, and a display 316. Exemplary game input devices include game controllers, keyboards, a mouse, a touch pad, a touch screen, a microphone for receiving voice commands, a depth camera, a video camera, a keyboard, and a trackball. Embodiments of the present invention are not limited to these input devices. The display device 316 is capable of displaying video game content. For example, the display 316 may be a television or computer screen. In another embodiment, the display 316 is a touch screen integrated with the game client 310.

The game client 310 is a computing device that is able to execute video games. The game client 310 could be a tablet or a laptop computer. In another embodiment, the game client 310 is a game console and the display 316 is a remote display communicatively coupled to the game console. The game client 310 includes an operating environment 320, a game migration component 321, a game execution environment 322, a game data store 324, a game service client 326, and a player profile data store 328.

The operating environment 320 may be provided by an operating system that manages the hardware and provides services to application running on the game client 310. The operating environment may allocate client resources to different application as part of the game migration. For example, the operating environment may give control of the display to the game execution environment 322 once game play is migrated to the game client 310.

The game migration component 321 manages game migration functions performed by the client 310. The game migration component 321 may initiate migration of game play from the client 310 to the game server 340. The game migration component 321 may also participate in migrating game play from the game server 340 to the client 310. The game migration component 321 may communicate with the game service running on the game server 340 to request migration of a game session to the game server 340. The request may include the particular game the request is associated with as well as the state of the current game if it is running within the game execution environment 322. Game play may be migrated in response to instructions received from the server or detection of a triggering event. The game migration component 321 may detect a triggering event.

Several trigger events are possible. There are several scenarios where reaching the end of a partially downloaded game is a trigger to move play to the server 340 until the next portion of the game is available for play on the client. In one scenario, the user downloads a first portion of the game in a block, such as a block that allows the user to play levels one through three. As a user approaches the end of level three, and the next block has not been downloaded, a triggering event may be recognized. The game migration would occur to allow user to play level four on the server when the end of level three is reached.

In another embodiment, a game-purchase event is a trigger. When the demo portion of the game runs out, without the rest of the game having first been downloaded, the game play may migrate from the game client 310 to the server 340 upon purchasing a full version of the game. In another scenario, even games that have been fully downloaded to the game console may have game experiences or levels that are only provided by the server. For example, a game may have a final level that is extremely large and only available on the server. For example, the final level could allow the user to play as one of thousands of bad characters.

The game execution environment 322 comprises the gaming resources on the client 310 required to execute instances of a game. The game execution environment 322 comprises active memory along with computing and video processing. The game execution environment 322 receives gaming controls and causes the game to be manipulated and progressed according to its programming. In one embodiment, the game execution environment 322 outputs a rendered video stream that is communicated to the game client. In other embodiments, the game execution environment 322 outputs game geometry, or other representations, which may be combined with local objects on the gaming client to render the gaming video.

The game data store 324 stores downloaded games and partially downloaded games. Games may be downloaded in playable blocks. For example, the first playable block could allow the player to play a first level. In one embodiment, the blocks are divided, which starts and stops at a game transition point, such as a level change. To play a game, the game may need to be loaded from the game data store 324 into active memory associated with the game execution environment 322.

The game service client 326 is a client application that displays rendered video game images received from the game service running on server 340. The game service client 326 may also process game input and change it into an easily uploadable format that is communicated to the server 340. The game service client 326 may also scale the rendered video game images received from the server 340 to a size optimized for display 316.

The player profile data store 328 stores player profile information for individual games. The player profile information may also save tombstones or game-saved data for individual games. This player profile data or game progress data may be communicated back and forth as part of the game migration process. For example, when a game is migrated from the server 340 to the game client 310, a game-save file or tombstone may be communicated to the game client 310. Both the game-save file and the tombstone record game progress. The game execution environment 322 then reads the game-saved data to start the game where the player left off on the server. The opposite scenario is also possible where the game-saved data and player profile information is uploaded from the game client 310 to the server 340 when game play migrates from the client to the server.

The game server 340 comprises a connection manager 342, a player profile data store 344, a game migration manager 346, a game execution environment 348, a game data store 350, a game manager 352, and a game promotion manager 354. Though depicted as a single box, the game server 340 could be a server farm that comprises numerous machines, or even several server farms.

The connection manager 342 builds a connection between the client 310 and the server 340. The connection manager 342 may also provide various authentication mechanisms to make sure that the user is authorized to access the game service provided by the server 340. The connection manager 342 may also analyze the bandwidth available within a connection and throttle the download of a game during game play to make sure that game play is not degraded.

The player profile data store 344 may work in conjunction with the connection manager 342 to build and store player information. Part of the player profile may comprise demographic and financial information such as a player's name, address and credit card information or other mechanism for paying for or purchasing games and experiences provided by the game service.

In addition, the player profile data store 344 may store a player's progress within an individual game. As a player progresses through a game, the player's score and access to game levels may be stored. Further, the player profile data store 344 may store information about individual player preferences such as language preferences. Information regarding a player's game client and speed of the network connection may also be stored and utilized to optimize the gaming experience. For example, in one embodiment, when a geographically proximate server farm is busy, players with higher latency Internet connections may be preferentially connected to proximate server farms while players with lower latency connections may be connected to server farms that are further away. In this way, the players with the network connections that are best able to handle the additional latency are connected to server farms that create additional latency because of their location.

The player profile data store 344 may also store a usage history for the individual player. A player's history of purchasing games, sampling games, or playing games through a game service that does not require the purchase of the games may be stored. The usage information may be analyzed to suggest games of interest to an individual player. In one embodiment, the purchase history may include games that are not purchased through the game service. For example, the purchase history may be augmented by the player entering in a key from a game purchased in a retail store. In some embodiments, the player may then have access to that game both on their game client 310 and through the game service when they are no longer at their game client.

The game migration manager 346 manages the migration of game play from the server 340 to the client 310 and may help with the migration of game play from the client 310 to the server 340. As with game migration component 321, the game migration manager 346 may detect trigger events and initiate game migration in response. In addition to the triggering events mentioned previously, the successful download of a game block containing code for a game currently being played on the server 340 is a triggering event that may initiate game migration from the server 340 to the client 310. For example, the user may be playing a first game that is running on the server. The game migration manager 346 (or other component) communicates to the client the block of data required to play the first part of the game. Once this block of data is successfully downloaded, then an instruction may be sent to migrate game play from the server 340 to the client 310. Once the game is successfully migrated, the bandwidth previously being used to play the game on the server may be dedicated to downloading the rest of the game to the client 310.

The game execution environment 348 comprises the gaming resources required to execute instances of a game. These are the resources described previously that are managed by the game manager 352 and other components. The game execution environment 348 comprises active memory along with computing and video processing. The game execution environment 348 receives gaming controls through an I/O channel and causes the game to be manipulated and progressed according to its programming. In one embodiment, the game execution environment 348 outputs a rendered video stream that is communicated to the game client. In other embodiments, the game execution environment 348 outputs game geometry, or other representations, which may be combined with local objects on the gaming client to render the gaming video.

The game data store 350 stores available games. The games may be retrieved from the data store and activated through an active memory. The game data store 350 may be described as passive or secondary memory. In general, games may not be played off of the game data store 350. However, in some embodiments, the secondary memory may be utilized as virtual memory, in which case portions of the game data store 350 may also serve as active memory. This illustrates that active memory is not necessarily defined by a particular hardware component, but is defined by the ability of the game resources to actively manipulate and access objects within the memory to execute the game.

The game manager 352 manages players' connections into active games. In one embodiment, there are individual game managers for each game available through the game service.

Taking a single game as an example, the game manager will drop players into requested games. The game manager 352 also manages active games. In one embodiment, a player may connect to a game through the game manager 352. In other words, the game manager 352 may act as a gatekeeper for communications and connections between individual game instances. When a player drops out of a game, an instruction may go to the game manager to retrieve and save the player's progress into the player's profile within player profile data store 344. Once a player drops out of a game, the game may be shut down by the game manager 352.

The game promotion manager 354 will preemptively download to a game client 310 blocks of game that provide a game sample or demo. The game blocks may be the first part of a full game or specially designed demos. Either way, the game promotion manager 354 may identify a player's likely game interest and select relevant games for download to the game client 310. Once downloaded, the user may be notified that the game sample or demo may be played. The user may be given the option to purchase the game during game play, which may be a trigger event. Once purchased, the remainder of the game may be downloaded and the user can be migrated to the full server version of the game while the download occurs, if needed.

Figure 4:
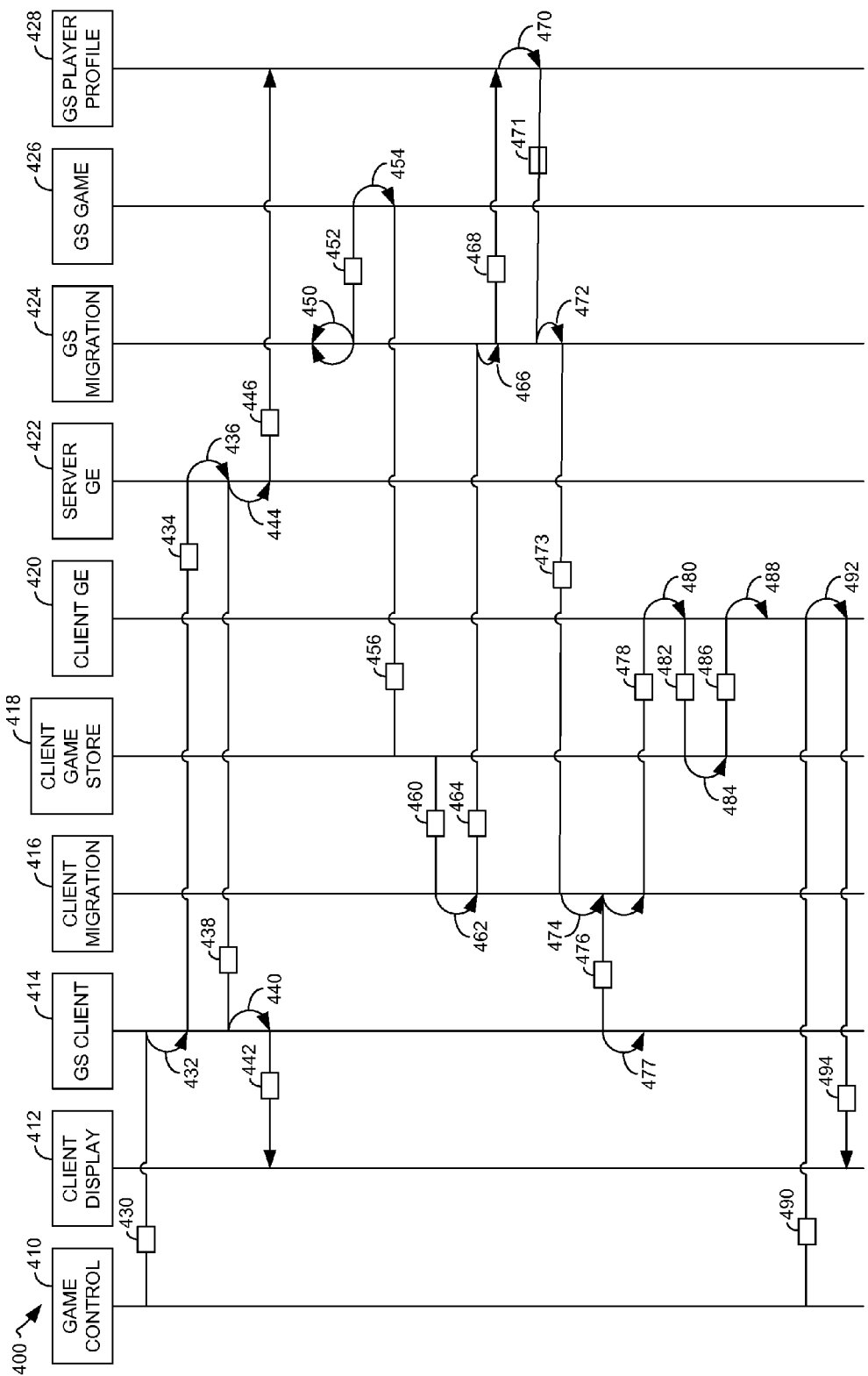
FIG. 4 is a sequence diagram showing communications within a gaming environment that facilitate the migration of game play from a gaming server to a gaming client, in accordance with an embodiment of the present invention.

Turning now to FIG. 4, a sequence diagram showing communications within a gaming environment 400 that facilitate the migration of game play from a gaming server to a gaming client is shown, in accordance with an embodiment of the present invention. The gaming environment 400 includes components operating on a gaming client, perhaps similar to game client 310, as well as components operating on a game server that could be similar to game server 340.

The components located on the game client include a game controller 410, a client display 412, a game service client application 414, a client migration component 416, a client game store 418, and a client gaming environment 420. Components located in the gaming service include game service gaming environment 422, game service migration component 424, game service data store 426, and game service player profile data store 428. Both the client and the gaming service may include additional components that are not shown in FIG. 4 for the sake of simplicity.

Initially, control input 430 from the game controller 410 is communicated to the game service client application 414 running on the client device. The control input 430 may be preprocessed 432 into a form usable by the game service gaming environment 422 running on the game service server. The preprocessing is not required in some embodiments in which case the raw input signal may be communicated. The preprocessed control input 434 is communicated from the game service client 414 to the game service gaming environment 422 where it is used to manipulate 436 game objects. A new game image 438 is rendered in response to the control input 434 and communicated to the game service client 414. The rendered game image 438 is scaled 440 to a size appropriate for the client display 412, if needed. The scaled video image 442 is communicated to the client display 412 for display to the user.

Game state information 446 is generated 444 and then communicated to the gaming-service player profile data store 428. The game state is periodically saved so that a user may return to a point in the game. Other components may also monitor game state information for triggering events.

A download trigger, which is distinct from a migration trigger, is detected at step 450. The download trigger may be a user decision to purchase the rest of the game being played in the ongoing gaming session. For example, the user may start out playing a first block of the game that was downloaded as part of a promotion or demo. In another embodiment, the user has previously purchased the game but did not have available bandwidth to download the next block of the game. The download event 450 could be detecting the change in the user's bandwidth or bandwidth usage to provide download availability.

A download request or instruction 452 is communicated from the game service migration component 424 to the game data store 426. The game data store prepares 454 the next block of the game to be downloaded and downloads the game block 456 to the client game store 418. The client game store 418 saves 458 the game block 456. Though depicted as a single message, the game block 456 and other messages shown in the sequence diagram may actually be a series of messages that occur over time. For example, in some situations, it may take twenty or thirty minutes to download the game block 456 to the client game store 418 depending on the available bandwidth in the user's connection. Once saved, a notification 460 is sent to the client migration component 416 indicating that the game block is ready for use. At step 462, a download completion message 464 is generated and communicated to the game service migration component 424.

At step 466, a game-migration trigger is detected. In this case, the complete downloading of a game block to the client device constitutes the triggering event. Upon detecting the trigger 466, information needed for the migration is gathered. In this case, the request for game state information 468 is generated and communicated to the gaming service's player profile data store 428. The game state is retrieved 470 and a game-state message 471, which describes current player progress and other game parameters is communicated to the client migration component 416. Using the game state information, a games migration message 473 is generated 472 and communicated the client migration component 416 or other component on the client device. The game migration message provides the client device the information needed to start game play on the client where it left of on the server.

Upon receiving the state information and migration instruction, the client migration component 416 begins the game migration process from the client side at step 474. A message 476 terminating activity on the game service client 414, which had previously been receiving the rendered video game image is communicated. The termination may not be immediate. Once the client gaming environment 420 has the ongoing game loaded into active memory and is ready to take over, the game service client 414 is terminated 477. Terminated may indicate that the gaming service application is closed or just minimized. Either way, the game service client 414 is not actively involved in processing or displaying information received from the game server once it is terminated.

An activation message 478 is also sent to the client side gaming environment 420. Game activation 480 begins in response to the activation message 478. As part of the activation 480, the client gaming environment 420 requests 482 the game code from the client game store 418. The game code is prepared 484 and communicated 486 back to the client gaming environment 420. The gaming data is then loaded 488 into active memory and prepared for game play. The game state information received previously is used to set the game at a point where the user requested it. In one embodiment, the gaming environment 420 has the game activated and ready for play while game play continues on a gaming server and rendered images are displayed through the game service client 414. Upon reaching a transitional point in the game, such as switching levels, the game play is transitioned from the game service client 414 to the client gaming environment 420.

Once transitioned, game control data 490 is communicated to the client gaming environment 420 where game objects are manipulated 492 and a new video game image is rendered. The new video game image 494 is communicated to the client display 412 where it is displayed to the user.

Figure 5:
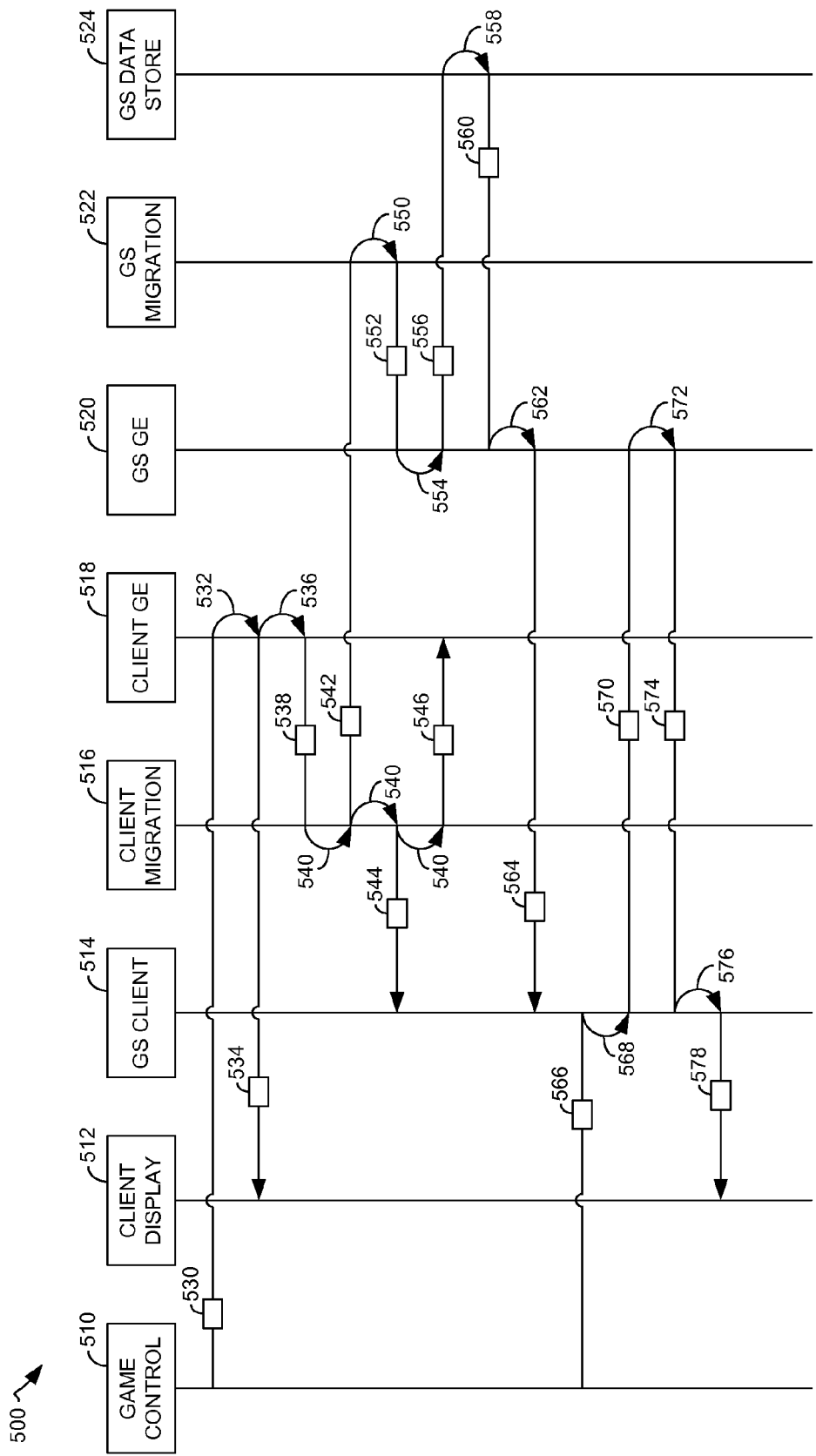
FIG. 5 is a sequence diagram showing communications occurring within a gaming environment during migration of a game from a client gaming device to a server located gaming service, in accordance with an embodiment of the present invention.

Turning now to FIG. 5, a sequence diagram showing communications occurring within a gaming environment 500 during migration of a game from a client gaming device to a server located gaming service is shown, in accordance with an embodiment of the present invention. The gaming environment 500 includes components operating on a gaming client, perhaps similar to game client 310, as well as components operating on a game server that could be similar to game server 340. The components located on the game client include a game controller 510, a client display 512, a game service client application 314, a client migration component 516, and a client gaming environment 518. Components located in the gaming service include game service gaming environment 520, game service migration component 522, and game service data store 524. Both the client and the gaming service may include additional components that are not shown in FIG. 5 for the sake of simplicity.

Initially, the user is playing a game that is running within the client's gaming environment 518. The gaming signals 530 are communicated from game controller 510 to the client gaming environment 518 where the game objects are manipulated in response to the signals 530 and the video game is rendered 532. The rendered video game image 534 is communicated to the display device 512 where it is displayed to the user.

At step 536, the client gaming environment 518 communicates a game state update message 538 to the client migration component 516. The game state update message 538 may describe the user's current progress within a game as well as other instructions or requests made by the user. For example, the user could have entered a menu request for a new level.

At step 540, the client migration component 516 analyzes the game state message 538 and determines that a triggering event has occurred. For example, the user may have requested a new level or reached a point in the game where a new level that has not yet been downloaded to the game client is accessed. At this point, the client migration component 516 generates a series of communications to start the migration process.

Upon detecting the trigger, the client migration component 516 communicates a migration request 542 to the game service migration component 522. This may first necessitate opening a communication session with the game service if one is not already active. The process of opening a communication session is not shown in FIG. 5 nor is the authentication process or other processes that may be required for the gaming service to accept the game migration request.

The game migration component 522 analyzes the migration request at 542 at step 550. The request may be analyzed for resource availability. For example, the game service migration component 522 may query available resources to determine if an instance of the game at a particular level is available or can be made available to the user. The game service migration component may also query other components to make sure that the user has appropriate access for the requested game level. Though not shown, the game service migration component 522 may query the client side migration component 516 for additional information if needed.

Turning back to the game communications issued by the client migration component 516 upon detecting a triggering event, at step 540, the client migration component 516 may send an activation request 544 to the game service client application 514. The activation request 544 causes the game service client application 514 to open and to prepare for receiving a rendered video game. In addition, the client migration component 516 sends a termination message 546 to the client gaming environment 518 that instructs termination of the game execution, pending migration to the gaming service server.

In response to receiving the migration request 542, the game service migration component 522 communicates an activation message 552 to the game service gaming environment 520. In response to the activation message 552, the game service gaming environment 520 activates an instance of the requested game at a point in the game requested by the user. The game service gaming environment 520 may receive player profile and game state information within the activation message 552. This information may have been communicated in the migration request 542 or through a separate message not shown in the sequence diagram of FIG. 5.

As part of the activation 554, the game service gaming environment 520 may send a game data request 556 to the game data store 524. In response, a game data package is prepared 558 and communicated 560 to the game service gaming environment 520. At step 562, the game service gaming environment 520 loads the game data into active memory and prepares to receive I/O connection and data from the game service client application 514 or other components associated with the game client.

Once activated, the game service gaming environment 520 sends a rendered image of the video game to the game service client application 514. The rendered image is shown as message 564. Upon receipt, the game service client application 514 may communicate the image to the client display 512.

Game control data received from game controller 510 is communicated to the game service client application 514. The control data 566 is preprocessed at step 568 to an easily uploadable format that will be processed by game service gaming environment 520. The preprocessed game controls 570 are communicated to the game service environment 520. The game objects are manipulated in response to the controls 570 at step 572. A new rendered game image 574 is then communicated back to game service client application 514 where it may be scaled for the client display 512 at step 576. Once appropriately scaled, the rendered image is communicated 578 to the client display 512 where it appears to the user.

Turning now to FIG. 6, a method 600 of migrating game play from a game server to a client device is shown, in accordance with an embodiment of the present invention. The game server may be affiliated with a game service that allows to play a game remotely. The client device may be a game console, a personal computer, a tablet, a smart phone, or other suitable device.

At step 610, a video game is executed at a server within a remote gaming session. As part of the remote gaming session, control input is received from a client device over a data connection. For example, a game controller such as a joystick, may send control inputs to a client device that passes them on to the game server through a data connection occurring over the Internet. As part of the gaming session, game objects are manipulated in response to the control input and a rendered image of the video game is communicated over the data connection to the client. Thus, the game code is executed in combination with the control input and a video game image is rendered and communicated to the client.

At step 620, a game-migration trigger event for the video game is detected at the game server. Several game-migration triggers have been described previously. In one embodiment, the game-migration trigger is completing the process of downloading a game block for the video game to the client device. The game block may enable the currently played video game to be played on the client device without the need for the game server to render the video game image. In another embodiment, the game-migration trigger event also requires the user to have reached a transition point in the game. A transition point is a point in the game where the video game execution and rendering may be transferred from the server to the client without disrupting game play. For example, the user could be at the end of a level, within a game menu, or have the game temporarily paused. Thus, a trigger event may require satisfaction of multiple criteria. For example, the first criteria could be the complete download of the current game block and the second criteria could be game play reaching transition point. The trigger event may be detected by monitoring download progress and game play progress.

The game block may be downloaded to the game client in response to detection of a download trigger event. A download trigger event, may be the purchase of the full game. Another download trigger event, is the change in usage within the current user's data connection to make bandwidth available for the download. For example, the user's game play and other activities may be consuming nearly 100% of the available bandwidth within the user's data connection. Upon changing usage, for example by closing a streaming music application on the client, bandwidth may be made available for the download. Once available, download of the next game block could be triggered.

At step 630, in response to detecting the game-migration trigger event, a game-migration instruction is communicated to the client device. The game-migration instruction asks the client device to begin switching game execution from the game server to the game client.

Switching game execution from the game server to the game client may require various steps. For example, a game image received from the game server may be displayed in a game service client device that is closed as part of the migration process. The game code for the desired video game may need to be loaded into the active memory within the client's native game execution environment. This may require opening one or more applications in addition to loading the game into active memory. Player profile information that explains various game preferences or settings for the current game is used to adjust settings in the game instance running on the client. In addition, game-saved information received from the server may be used to load the video game to the point where the game had progressed on the server.

The controls are routed into the local gaming environment on the client and away from the server. Once the game is fully ready for the user to engage locally, at step 640, the execution of the video game on the server is terminated. Once the video game image rendered by the server is terminated, the video game image rendered by the client gaming environment is shown to the user. During the transition, a waiting screen or game summary screen, advertisement, or other feature may be shown briefly to the user while the interface is transitioned. Once the game migration is completed, a confirmation message may be received by the game server. In response to this message, the game server may tear down the gaming instance and free up the server resources for use by another player.

In some multiplayer games, communications that are part of the multiplayer game may be rerouted from the server based instance to the client. Communications may include text or voice generated by other players. Communications may also be game controls that allow the client to render game changes made by other players. For example, the communications may explain where other game characters have moved and other actions they take that change the virtual game world, such as moving virtual objects.

In one embodiment, the game block is communicated to the client device at a rate that is calculated to use most of the available bandwidth without encroaching on bandwidth used for the gaming session. The gaming session uses bandwidth to download the rendered video game images to the client and upload of the control input from the client to the server. In one embodiment, the download rate is the difference between the available bandwidth, and the maximum bandwidth rate used during the video game experience. In another embodiment, the average bandwidth used during the video game experience is used to calculate the difference between the available bandwidth on the data connection and the usage attributable to the video game experience. The bandwidth used by the gaming session may change as different controls are used. For example, bandwidth usage will go up when voice commands are added to joystick control signals.

Turning now to FIG. 7, a flow chart showing a method 700 of migrating game play from a client device to a game server is shown, in accordance with an embodiment of the present invention. At step 710, a video game is executed at a game client. As part of the execution, control input is received from a local game controller communicatively coupled to the game client. For example, a joystick or depth camera could be connected to the game client through a hard connection or through a wireless connection. Either way, game objects are manipulated in response to the control input and a rendered image of the video game is generated by the client and displayed to the client through a display device associated with the game client. The display device to be integrated into the game client or a separate stand-alone device such as a television.

Thus, at step 710 the video game is being executed at the game client. This may entail the video game code being loaded into active memory within the client's game execution environment and the utilization of local client resources, such as a graphics processing unit and central processing unit, to process the game code and render video game images accordingly.

At step 720, a game-migration trigger event for the video game is detected at the game client. Examples of a game-migration trigger event include request to play a level of the video game for which code is not currently downloaded to the client device. In another example, the game-migration trigger event is the user reaching a threshold period from the end of a level in a video game when the next level of video game is not available for play on the client device. The next level may not be available because it is a level designed to be played on the server and not downloaded to the client. In another embodiment, the next level is not available, because it has not yet been downloaded to the client for a number of reasons. For example, the next level of the video game may not have been purchased yet. In another embodiment, the next portion or block of the video game has not had an opportunity to download during game play or otherwise.

At step 730, in response to detecting the trigger events, a game-migration instruction is communicated to a game server to begin switching game execution from the client to the game server. As part of this process, server authentication functions may be performed to confirm that the client device, or a user associated with the client device, has access to the gaming service and to multiple levels of the game. If the user does not have access to the gaming service to the next level of the game, the user may be provided the opportunity to purchase that access or otherwise provide authentication information. Once the user provides this information, for example by purchasing a full version of the game, the game migration process continues to allow the user to continue game play on the server. In one embodiment, while the game play immediately begins on the server, the next block of the video game is downloaded to the client device within available bandwidth. At the conclusion of that download, game play may migrate back to the client device.

At step 740, execution of the video game on the client is terminated. This may be done in response to a confirmation message indicating that the user is ready to be transferred for game play on the game server. At step 750, additional control inputs received from the local game controller are communicated to the game server. In one embodiment, these control inputs are preprocessed into a format that is convenient for upload to the game server. In one embodiment, the code for the video game running on the game server is the same code that runs on the game client. This enables the control input to be directly communicated to the game server without alteration in one embodiment.

At step 760, rendered images of the video game are received from the game server. The rendered images may be displayed by a game service client running on the client device. The rendered images reflect the changes to the game made in response to the additional control inputs. Again, while game play is ongoing, the next block of the video game may be received and saved. Once the download of the next block of the video game is complete, the game execution and rendering may migrate back to the client device.

Figure 8:
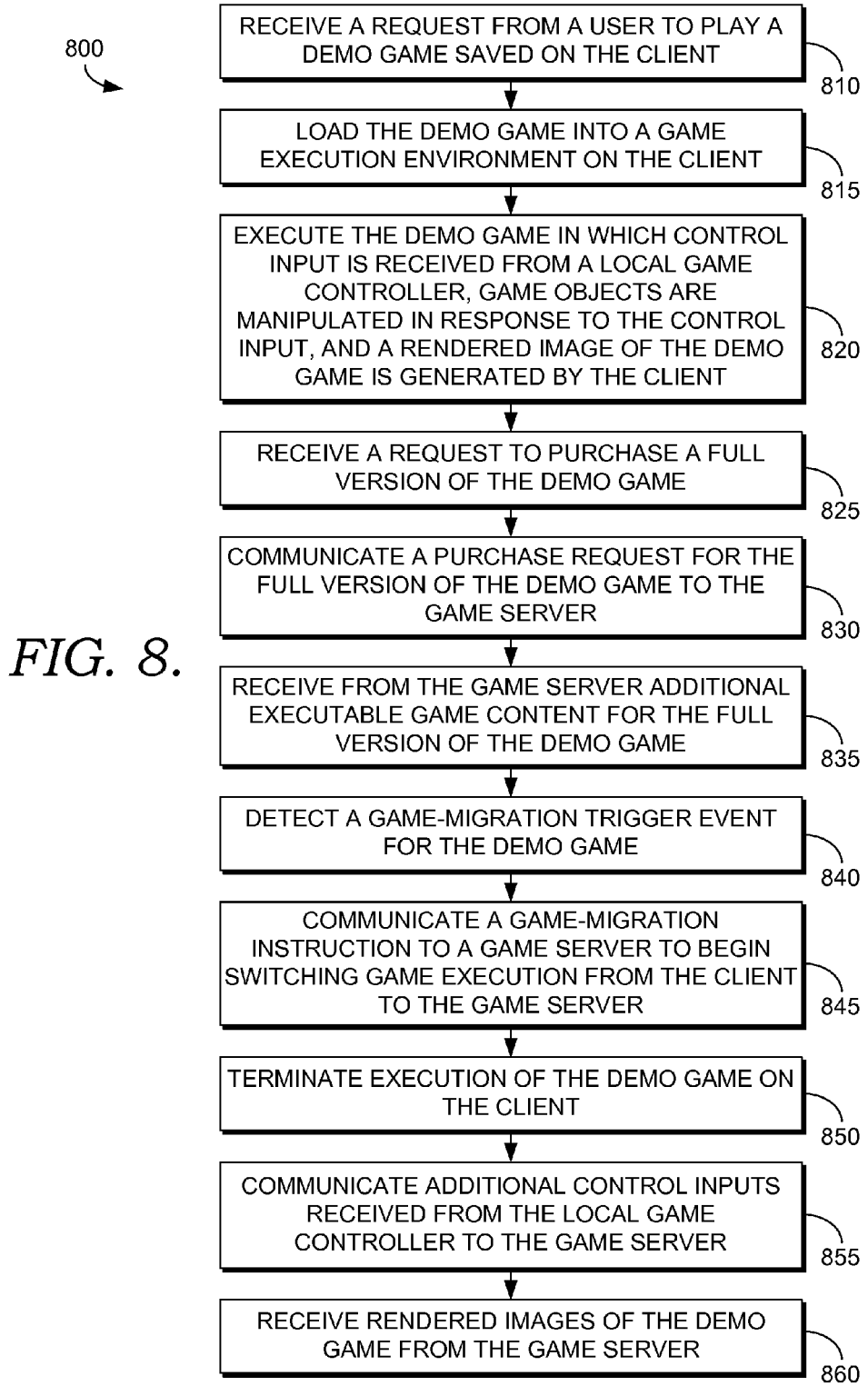
FIG. 8 is a flow chart showing a method of migrating execution of a video game between a client and a game server, in accordance with an embodiment of the present invention.

Turning now to FIG. 8, a flow chart showing a method 800 of migrating execution of a video game between a client and a game server is shown, in accordance with an embodiment of the present invention. At step 810, a request from a user to play a partial game saved on the client is received. In one embodiment, a game service may preemptively download sample or demo games to a game client, which may be the partial version of the game. An interface may be shown on the client to make the user know what games may be sampled. In one embodiment, the partial is the first part of a video game, such as the first level. The partial may have full access or limited access to game features.

At step 815, the partial game is loaded into a game execution environment on the client. This may include loading the game into the client device's active memory adding player profile information to the game and performing other tasks needed for the game to be executed on the client.

At step 820, the partial game is executed at the client. As part of the game, control input is received from a local game controller, such as a microphone for receiving voice commands, a depth camera for receiving gestures, a joystick, a keyboard, a touch screen or other game controller. In response to the input, game objects are manipulated and a rendered image of the video game is generated by the client. At step 825, a request to purchase a full version of the partial game is received at the client. At step 830, a purchase request for the full version of the partial game is communicated to the game server. At step 835, additional executable game content for the full version of the game is received from the game server. At step 840, a game-migration trigger event for the partial game is detected at the game client. In one embodiment, the trigger event is the completion of the download. The additional executable game code may be received during or while game play is ongoing.

At step 845, in response to detecting the trigger event, a game migration instruction is communicated to a game server to begin switching game execution from the client to the game server. In this embodiment, the game trigger event may be the player reaching the end of the partial game or the end of a level after which game code is not available on the game client.

At step 850, execution of the partial game is terminated on the client. At step 855, additional control inputs received from the local game control are communicated to the game server and at step 860 rendered images of the video game are received from the game server. The rendered images reflect the additional control inputs received and communicated previously.

In one embodiment, a plurality of partial games are received from the game service. The partial games may be selected based on the types of games played on the client device.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage media having computer-executable instructions embodied thereon that when executed by a computing device perform a method of migrating game play from a client to a game server, the method comprising:
   executing, at a client, a game code for a video game in which control input is received from a local game controller, game objects are manipulated in response to the control input, and a rendered image of the video game is generated by the client;
   detecting, at the client, a game-migration trigger event for the video game, wherein the game-migration trigger comprises the user pausing the video game;
   in response to said detecting, communicating a game-migration instruction to a game server to begin switching game execution from the client to the game server;
   terminating execution of the video game on the client;
   communicating additional control inputs received from a local game controller to the game server;
   receiving rendered images of the video game from the game server that is executing the same video game code executed by the client;
   communicating a purchase request for a full version of the game to the game server;
   communicating a download request to the game server; and
   based at least on the download request, receiving from the game server additional executable game content for the full version of the game, wherein said receiving from the game server additional executable game content for the full version of the game occurs simultaneously with game play of the partial version of the game ongoing on the client.

2. The media of claim 1, wherein the method further comprises communicating a download request to the game server, and
   in response to said download request, receiving, at the client, a block of executable game code for the video game while receiving the rendered images, wherein the block is executable to play a part of the video game currently being executed by the game server.

3. The media of claim 2, wherein the block is received at a rate calculated to utilize bandwidth available to the client that is not currently being used to receive the rendered image and communicate the control input to the game server.

4. The media of claim 1, wherein the game-migration trigger event also comprises selecting a game level for which game code required to execute the game level is not available on the client.

5. The media of claim 1, wherein the game-migration trigger event also comprises a user finishing a level in the video game.

6. The media of claim 1, wherein the method further comprises running, on the client, a game service client application that displays the rendered images of the video game and communicates the control input to the game server.

7. The media of claim 1, wherein the method further comprises preprocessing the control input into an upload format that comprises less data than the control input.

8. A method of migrating execution of a video game between a client and game server, the method comprising:
receiving a request to play a partial version of a game that is saved on the client, the partial version comprising less than all game content needed to play a full version of the game;
loading the partial version of the game into a game execution environment on the client;
executing, at the client, the partial version of the game in which control input is received from a local game controller, game objects are manipulated in response to the control input, and a rendered image of the partial version of the game is generated by the client;
detecting, at the client, a game-migration trigger event for the partial version of the game, wherein the game-migration trigger comprises the user pausing the video game;
in response to said detecting, communicating a game-migration instruction to a game server to begin switching game execution from the client to the game server;
terminating execution of the partial version of the game on the client;
communicating additional control inputs received from a local game controller to the game server;
receiving rendered images of the partial version of the game from the game server that is executing the same video game code executed by the client;
communicating a purchase request for the full version of the game to the game server;
communicating a download request to the game server; and
based at least on the download request, receiving from the game server additional executable game content for the full version of the game, wherein said receiving from the game server additional executable game content for the full version of the game occurs simultaneously with game play of the partial version of the game ongoing on the client.

9. The method of claim 8, further comprising:
receiving a plurality of partial games from a game server; and
saving the plurality of partial games on the client.

10. The method of claim 8, wherein the game-migration trigger event also comprises a request to play a portion of the full version of the game not supported by the partial version of the game.

11. The method of claim 8, wherein said receiving from the game server additional executable game content for the full version of the game occurs simultaneously with said receiving the rendered images of the partial version of the game from the game server.

12. The method of claim 8, wherein said terminating execution of the partial version of the game on the client occurs when at a point in game play that does not cause disruption.

13. A client computing system comprising:
a processor; and
computer storage memory having computer-executable instructions stored thereon which, when executed by the processor, configure the computing system to:
communicate control inputs received from a local game controller to the game server;
rendered images of the video game from the game server;
detect a game-migration trigger event for the video game wherein the game-migration trigger comprises the user pausing the video game;
in response to detecting the game-migration trigger event, communicate a game-migration instruction to a game server to begin switching game execution from the game server to the client computing system;
initiate execution of the video game on the client computing system;
execute, at the client computing system, a game code for a video game in which control input is received from the local game controller, game objects are manipulated in response to the control input, and a rendered image of the video game is generated by the client computing system;
communicate a purchase request for a full version of the game to the game server;
communicate a download request to the game server; and
based at least on the download request, receive from the game server additional executable game content for the full version of the game, wherein said receiving from the game server additional executable game content for the full version of the game occurs simultaneously with game play of the partial version of the game ongoing on the game server.

14. The system of claim 13, wherein the client computing system is further configured to
detect a change in available bandwidth between the game server and the client computing system to make bandwidth available for communicating additional game code to the client computing system without disrupting receipt of the rendered image of the video from the game server;
communicate a download request to the game server in response to said detecting the change in available bandwidth, and
receive, at the client computing system, a block of executable game code for the video game while receiving the rendered images,
wherein the block is executable to play a part of the video game currently being executed by the game server.

15. The system of claim 14, wherein the block is received at a rate calculated to utilize bandwidth available to the client computing system that is not currently being used to receive the rendered image and communicate the control input to the game server.

16. The system of claim 13, wherein the game-migration trigger event also comprises selecting a game level for which game code required to execute the game level is not available on the client computing system.

17. The system of claim 13, wherein the game-migration trigger event also comprises a user finishing a level in the video game.

18. The system of claim 13, wherein the method further comprises preprocessing the control input into an upload format that comprises less data than the control input.

\* \* \* \* \*